(12) United States Patent
Salzwedel

(10) Patent No.: US 6,389,277 B1
(45) Date of Patent: May 14, 2002

(54) CELLULAR CALL MODE DETERMINING DEVICE

(75) Inventor: Mark Salzwedel, Vista, CA (US)

(73) Assignee: Denso Corporation, Aichi-Ken (JP)

( * ) Notice: Subject to any disclaimer, the term of this patent is extended or adjusted under 35 U.S.C. 154(b) by 0 days.

(21) Appl. No.: 09/257,876

(22) Filed: Feb. 25, 1999

(51) Int. Cl.[7] ............................................. H04B 1/36
(52) U.S. Cl. ...................... 455/414; 455/415; 455/566; 455/575
(58) Field of Search .................. 455/412, 413, 455/414, 415, 418, 419, 422, 550, 556, 557, 558, 575, 566; 379/140, 142

(56) References Cited

U.S. PATENT DOCUMENTS 6,032,039 A * 2/2000 Kaplan ..................... 455/414
6,070,068 A * 5/2000 Sudo ........................ 455/414

* cited by examiner

Primary Examiner—Thanh Cong Le
(74) Attorney, Agent, or Firm—Fish & Richardson P.C.

(57) ABSTRACT

A telephone system which allows manual selection of a mode for an incoming telephone call. Incoming telephone calls bring up a menu of options which includes answering in voice mode, data mode, and fax mode. The user can select one of those modes. Another option allows the handset to automatically detect which devices are attached, and bring up only that option. Yet another option uses caller ID of incoming information to detect which options to prepare.

23 Claims, 4 Drawing Sheets

CELLULAR CALL MODE DETERMINING DEVICE

BACKGROUND

The present system relates to cellular telephones, and specifically to selection between different modes, i.e., data, fax, and voice, in such a cellular telephone.

The IS-95 standard permits receiving data, fax, and voice transmissions over the cellular system. More generally, the incoming call can be selected as being one of several modes. The receiver, e.g. the cell phone, can then send the incoming call to an attached fax machine, for example, if the incoming call is a fax.

However, certain networks, such as the current Sprint™ network, do not actually support the protocol indicated the way it was originally intended. In these certain networks, all calls are handled as voice. Operations must be prearranged. The handset that is to receive the call must be manually put in a special mode where it ignores the network instructions. This forces the call to take the selected mode. Therefore, for example, if the incoming call is a fax, the call is routed to a fax machine which receives and decodes the specific fax.

The problem, of course, is that this requires a priori knowledge of what calls are coming in. Moreover, once the telephone is put into its specific mode, the user must remember to remove the telephone from that specific mode, or else the next call will be erroneously answered as a fax.

SUMMARY

The present system describes a dynamic menu that can operate on a system where system-based control of the mode of the incoming call is not possible. According to this system, the user can select a mode of the incoming call from a menu which is dynamically-produced in the handset. This allows the user to select a desired target when the call first comes in.

The dynamic menu can also be used to allow the user to change the mode of the call, for example, in mid-call, to change to a modem or fax operation for a manual-driven fax. If the user answers by mistake, the user can be used to manually change to fax or data mode using the dynamic menu. Accordingly, this system gives the user the option, in a system which does not support automated switching between modes, to still answer a phone in one of multiple modes without having to prearrange the operation.

BRIEF DESCRIPTION OF THE DRAWINGS

These and other aspects will be described in detail with respect to the accompanying drawings, wherein.

DESCRIPTION OF THE PREFERRED EMBODIMENTS

Figure 1:
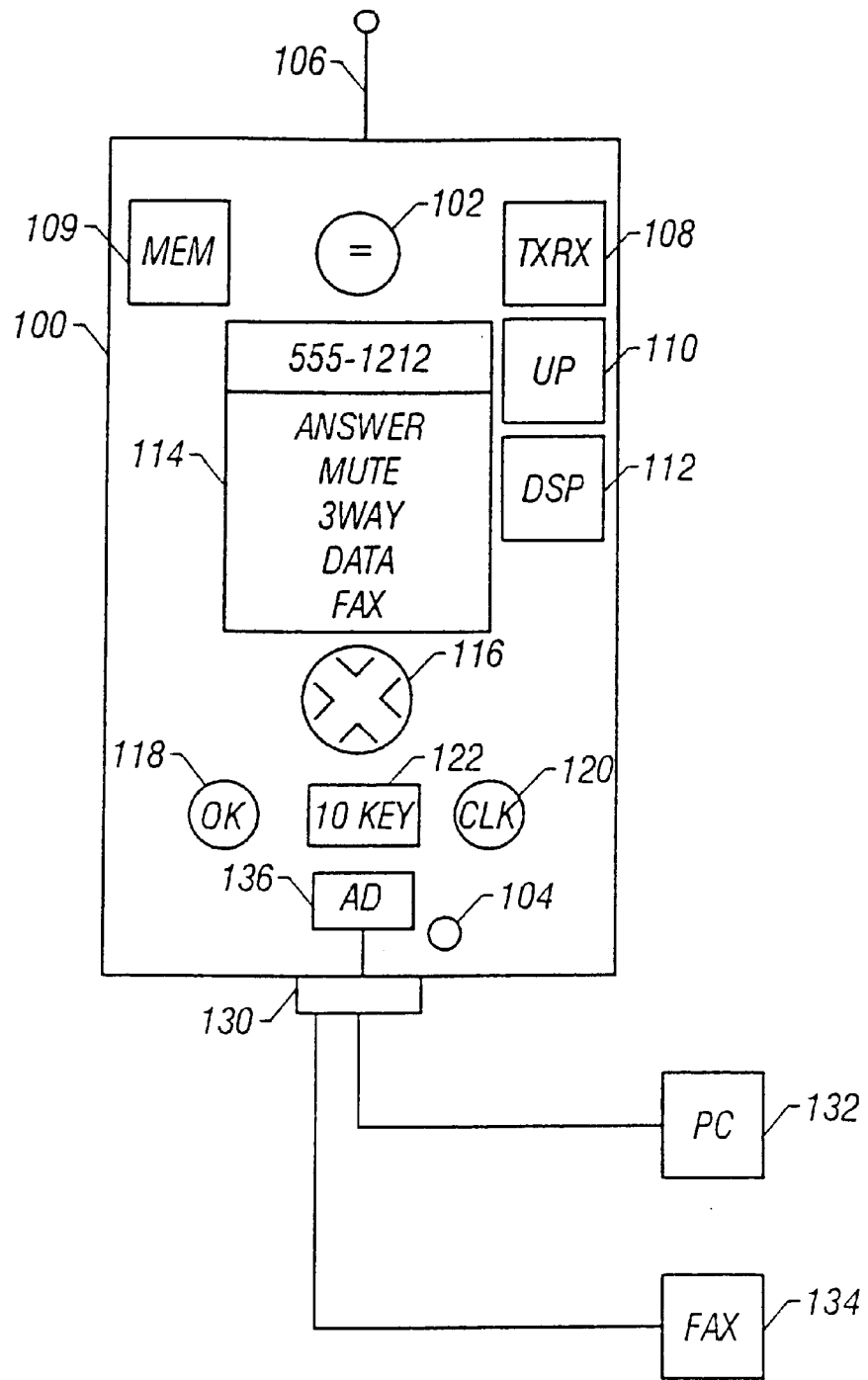
FIG. 1 shows a block diagram of the handset.

The preferred handset is shown in FIG. 1. The handset 100 includes the conventional handset portions thereon, including an earpiece 102, a microphone 104, and antenna 106. The handset also includes a cellular transceiver 108, a processor 110, and a digital signal processor 112. All of these are conventional and their structure is known by those of ordinary skill in the art.

The telephone also includes a dynamic menu which is displayed in window 114. The menu is dynamic in the sense that it produces different information depending on the current system operation. Selection on the dynamic menu is accomplished by a selector 116, as well as an acceptor switch 118. The system can also include a clear key 120. As conventional, a 10-key keypad allows entering numeric data, or alphanumeric data using a code.

The main telephone connector 130 includes the capability of connecting to external devices, including a computer 132 and/or a fax machine 134. An autodetector 136 automatically detects what, if any, kinds of machines are connected to the handset.

The processor 110 controls many of the operations of the overall system, as is conventional, and as is known in the art. As part of the processor's user interface routine, the processor executes the flowchart of FIG. 2. At step 200, the processor detects an incoming page to the handset, meaning that the handset has an incoming call that needs to be answered. At step 202, the processor carries out handshaking and detecting information from an incoming call, including, but not limited to, caller ID.

At step 204, the system detects, using the autodetect mechanism 136, if the data device or fax machine is attached to the handset. This can be carried out, for example, by polling the external connections—either at the time of the telephone ringing, or prior to that time—to determine if those externally-connected devices are attached and operating.

The following steps determine which of the data or fax is attached. Step 206 detects whether a fax is attached, and depending on whether the fax device is attached, the following steps 208 or 210 determine if the data device is attached. Depending on which machines are attached, the menu displays fax and data options at 212 if both fax and data are attached; fax-only option at 214 if only the fax is attached; or data-only option at 216 if neither is attached.

It may then be necessary to re-negotiate the connection with the network.

At step 218, the user selects one of the options from the menu. This usually means answering the call by selecting the answer option on menu 114, as may be the most usual way of operating. Alternatives include, however, answering the data and/or fax, assuming that one of those capabilities is in place.

At step 220, the phone answers according to the received selection. This includes ringing if the call is a voice call.

Figure 2A:
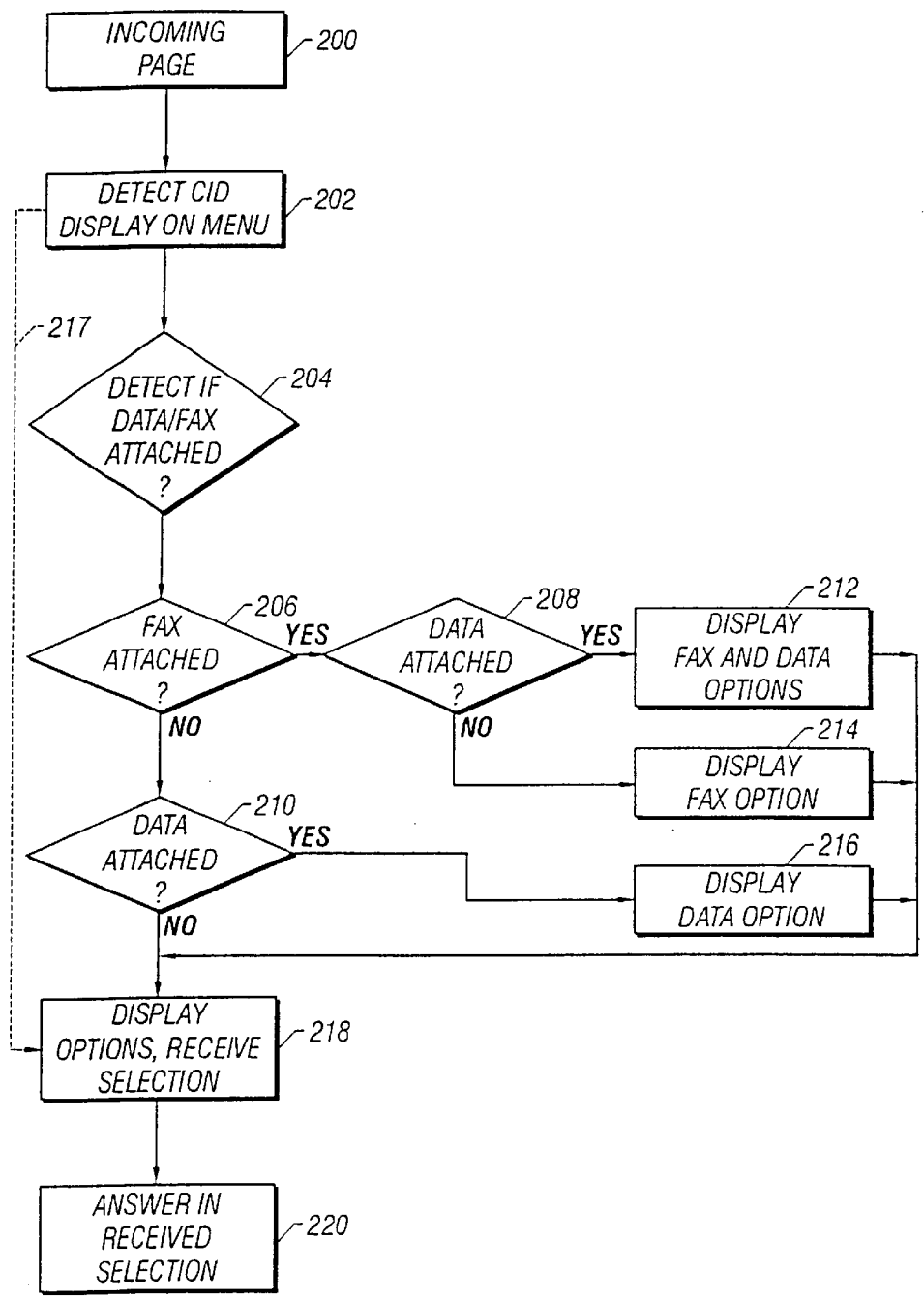
FIG. 2A shows a flowchart of operation in a first mode.

The preferred mode operates according to this flowchart of FIG. 2A. However, the steps 204 through 216 may be optional, and the dotted line 217 represents that the system can operate without these optional steps. For example, without the auto detection of data and fax, the system would always display the options of answering to the data and fax. This would allow the user to select one of these options.

Figures 2B, 3:
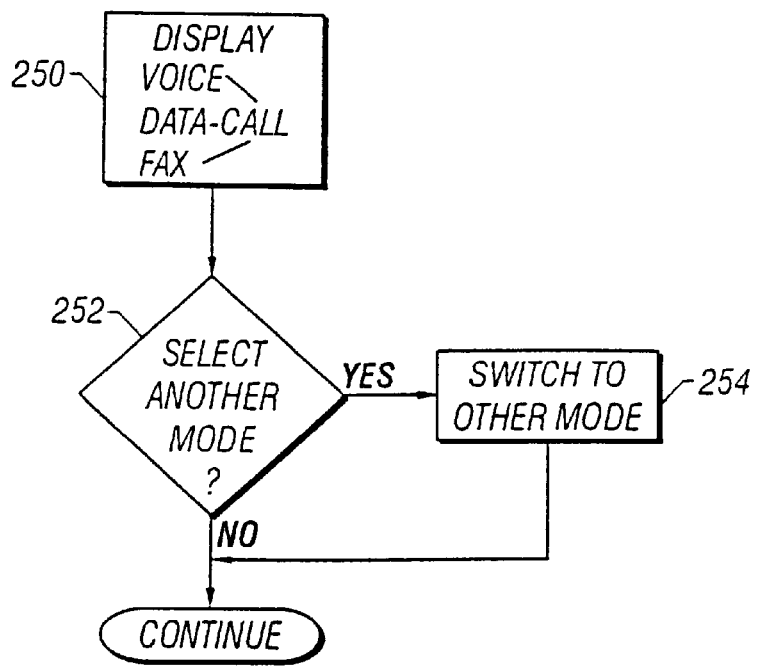
FIG. 2B shows the switching operation flowchart.
FIG. 3 shows an exemplary database.

After the call has been started, FIG. 2B represents an interrupt-driven routine or part of the main program loop which is executed continuously. This represents the change mode capability of the dynamic menu. At all times during the call, the menu displays at least all of the other possibilities for modes other than the one currently being executed. In the example shown in FIG. 2B, the display shows voice data and fax. However, if the call is currently a voice call, it may be possible to omit displaying the voice part. At any time, the user can select another mode at step 252. When the other mode is selected at step 252, the system switches to the other mode at step 254. Therefore, if the user erroneously believes that the incoming call is a voice call, and answers it as a voice call, the user may hear the fax tone being indicated. At that time, the user can manually hook up a fax machine and switch to fax. This allows using the dynamic menu to correct for an improper previous selection.

A second embodiment is described with reference to the following figures. This second embodiment operates using the conventional phonebook which is stored within the system's internal nonvolatile memory 109. Phone books conventionally include the user's telephone numbers. The telephone directory stored in memory has the general form 300 shown in FIG. 3. In this system, each of the contacts in the phonebook has an associated plurality of telephone numbers, including work, home, fax, and data, if appropriate. The modified flowchart for this embodiment operates as shown in FIG. 4.

Figure 4:
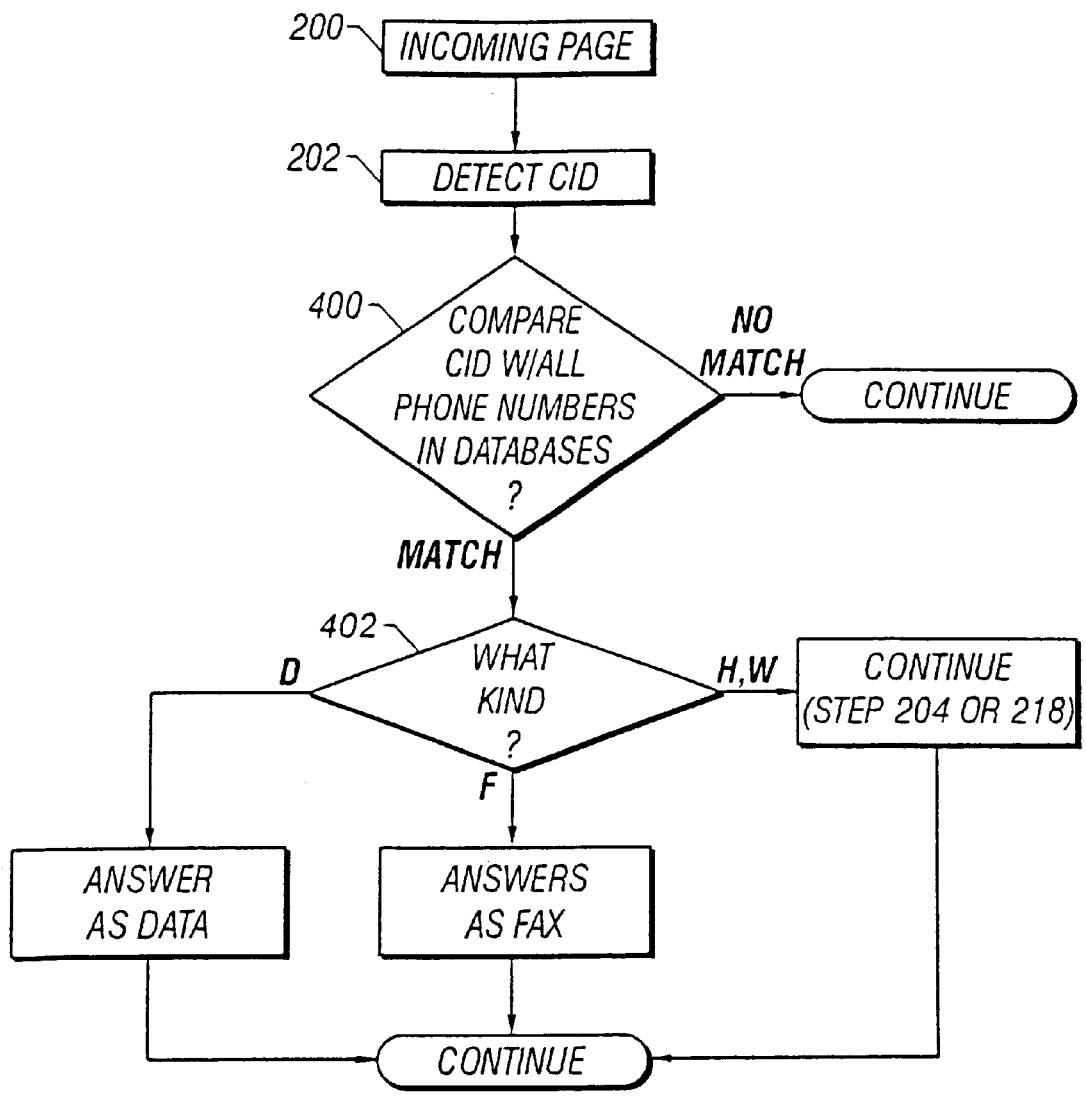
FIG. 4 shows a flowchart of the caller ID embodiment.

FIG. 4, like FIG. 2, receives an incoming page at 200, and detects the caller ID at 202. At step 400, the device compares the caller ID with all phone numbers in the database 300.

If there is no match, the operation continues, and can begin, for example, with step 204 in FIG. 2, or with step 218 in FIG. 2. If there is a match, the system carries out a further operation to determine information from the what kind of match is detected at step 402.

For example, the phone numbers can represent data, fax, or home or work, which represents a regular call. When a regular call is received, the system then continues, for example, by proceeding to step 204 or 218 in FIG. 2.

However, if a data caller ID is received, the system answers as data. If a fax caller ID is received, the system answers as a fax. In all these cases, the operation can simply be a default on the menu, and a different selection can still be received if desired. Also, the FIG. 2B override menu is displayed after the call is completed.

Although only a few embodiments have been disclosed in detail above, those of ordinary skill in the art certainly understand that modifications are possible from the preferred embodiment. For example, simply detecting an attached connector can be used to set the contents of the dynamic menu for all connector-driven devices. In this case, any time the connector was plugged in, the device would display data and fax possibilities.

Also, this system could be used with any phone system, not just IS95 or cellular.

All such modifications are intended to be encompassed within the following claims, in which:

What is claimed is:

1. A portable handset system for operation in a telephone system, comprising:
   an incoming call detector, operating to detect an incoming call;
   a menu and selector, responsive to detection of said incoming call, displaying at least two options, one of said options being a voice mode, answering the call for voice, and another of said options being a non-voice mode, answering the call for a mode other than voice, and allowing selection of one of said modes; and
   a switching mechanism, operating to answer the phone in the voice mode when the voice mode is selected and operating to answer the phone in the non-voice mode when the non-voice mode is selected.

2. A system as in claim 1 further comprising a connector allowing attachment of an external device, wherein said switching mechanism allows said external device to selectively answer when said non-voice mode is selected.

3. An apparatus as in claim 1 further comprising an autodetecting device which automatically detects whether an external device is attached.

4. A device as in claim 3 wherein said external devices include data devices and fax devices.

5. A device as in claim 4 further comprising a processor which assembles information to be displayed on said menu, including a list of devices that are detected by said autodetecting device.

6. A device as in claim 3 further comprising a memory for database information, said database information including voice telephone numbers and non-voice telephone numbers, and wherein said processor also compares a caller ID of an incoming number. against numbers in said database to determine a likely mode of an incoming call.

7. A method of operating a portable handset, comprising:
   receiving an indication of an incoming call;
   producing a dynamic menu, which has different alternatives at different times, said different alternatives at different times indicating external circumstances, and which, when said indication of the incoming call is received, indicates at least a first other option, other than answering the incoming call as a voice call;
   allowing a user to select a mode of the incoming call on said dynamic menu from a list of alternatives; and
   answering the incoming call according to the selected mode.

8. A method as in claim 7 wherein said list of alternatives includes voice, data, and fax.

9. A method as in claim 8 further comprising automatically detecting whether an external device is attached to the handset, and automatically providing detected results on said dynamic menu when said external device is attached.

10. A method as in claim 7 further comprising storing a plurality of numbers in a database within the handset, each number including an associated mode;
    caller IDing an incoming number; and
    reading the mode related to the caller ID number from the database.

11. A method as in claim 10 further comprising using the mode related to the caller ID number to determine the contents of the dynamic menu.

12. A method as in claim 10 further comprising using the mode related to the caller ID number to determine a default option on the menu.

13. A method as in claim 7 further comprising, after answering the incoming call, displaying a dynamic menu option allowing the user to change the selected mode.

14. A portable handset with a dynamic menu for operation in a cellular telephone system, comprising:
    a cellular transceiver, within said handset, operating to receive incoming information and transmit information;
    a processor, which controls an operation of the handset by detecting an incoming call received from the cellular transceiver, and producing a dynamic menu depending on conditions which are detected;
    a display which displays said dynamic menu;
    a selector which allows the user to select from the dynamic menu, allowing the user to select at least one of a first call mode of answering which is a normal voice call mode of answering, and a second call mode of answering which is other than a normal voice call mode of answering;

a connector device, including a connector for connecting to a device which operates in said other mode of answering; and said processor answering the call in the selected mode selected from the dynamic menu.

15. A device as in claim 14 wherein said non-voice mode is at least one of data and/or fax.

16. A device as in claim 15 wherein said external device is a data device and/or a fax device.

17. A device as in claim 15 further comprising an internal memory with a phonebook therein, said phonebook storing a plurality of telephone numbers, and indicating whether said telephone number is a voice number, or a non-voice number, wherein said processor operates to caller ID an incoming number, compare the caller ID results to information in said phonebook, and modify said dynamic menu depending on the comparing.

18. A device as in claim 17 wherein said modifying comprises changing a default on the dynamic menu to indicate the answer being the type of answer indicating by said information in said phonebook.

19. A method of operating a telephone, comprising:

receiving an incoming call;

obtaining caller ID information from said incoming call;

comparing said caller ID information with a database of caller ID information, at least a plurality of which indicate whether the call is a voice call, or a non-voice call; and indicating that the call should be answered as a non-voice call or a voice call depending on result of said comparing said caller ID information.

20. A method as in claim 19 wherein said non-voice call includes a fax call.

21. A method as in claim 20 further comprising forming a dynamic menu which indicates a user's option at any time, and, when receiving said indication of said incoming call, forming a dynamic menu which indicates answering options, said answering options including at least an option as determined from the caller ID information.

22. A method as in claim 21 wherein information from said caller ID is used to set a default in said dynamic menu.

23. A method as in claim 22 further comprising detecting whether a specified device is attached to said telephone, and using said devices which are attached as items in the dynamic menu.

* * * * *